United States Patent [19]

O'Russa

[11] 4,124,154

[45] Nov. 7, 1978

[54] FISH STRINGER

[76] Inventor: Lorence O'Russa, 314 N. Lincoln, Metamora, Ill. 61548

[21] Appl. No.: 687,015

[22] Filed: May 17, 1976

[51] Int. Cl.² .............. A45F 3/00; F16G 11/00
[52] U.S. Cl. .................. 224/7 E; 24/131 C; 43/4
[58] Field of Search ............. 43/4, 42.19, 44.83, 43/44.84, 44.89, 44.92, 44.94; 248/61 R; 211/91 R, 91.12; 24/237, 238, 131 R, 131 C, 139, 261 R, 230, 5 AD, 230.5 W; 224/7 R, 7 A, 7 B, 7 C, 7 D, 7 E

[56] References Cited

U.S. PATENT DOCUMENTS

| | | | |
|---|---|---|---|
| 2,135,847 | 11/1938 | Rosenquist | 43/44.88 |
| 2,202,976 | 6/1940 | Wise | 24/131 R |
| 2,709,287 | 5/1955 | Shelton et al. | 24/131 C |
| 2,804,247 | 8/1957 | Gallagher | 224/7 |
| 3,740,803 | 6/1973 | Arteburn | 43/43.12 |

*Primary Examiner*—Clifford D. Crowder
*Attorney, Agent, or Firm*—Howard H. Rogers, Jr.

[57] ABSTRACT

A fish stringer comprising a cord and a plurality of fish holders including links which are attachable to the cord between its ends in sliding relation thereon.

4 Claims, 7 Drawing Figures

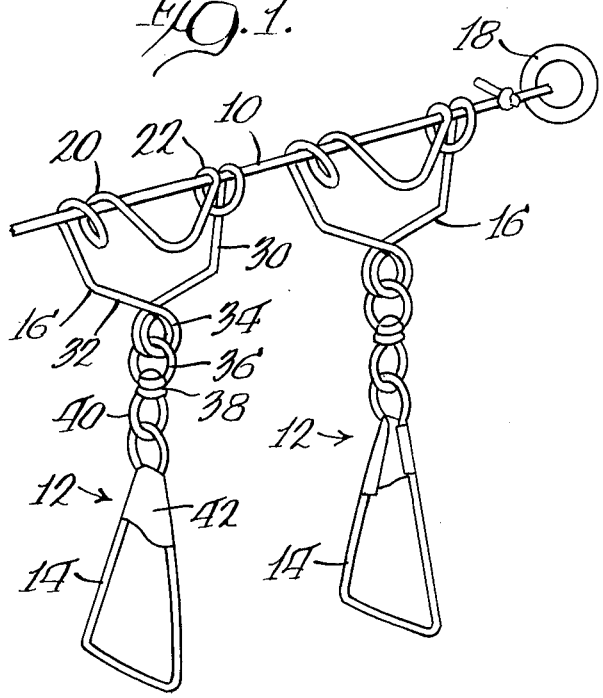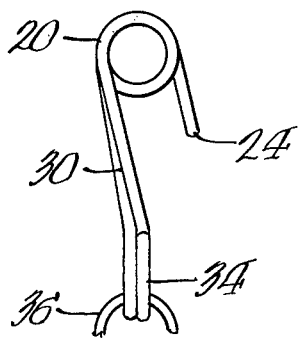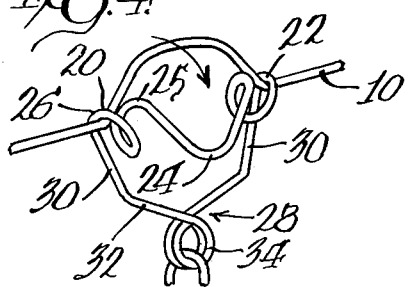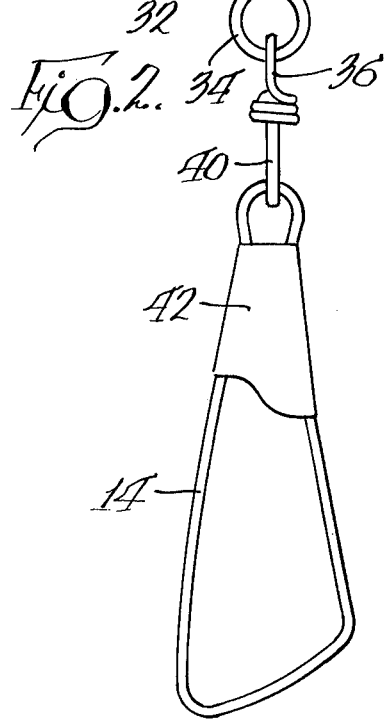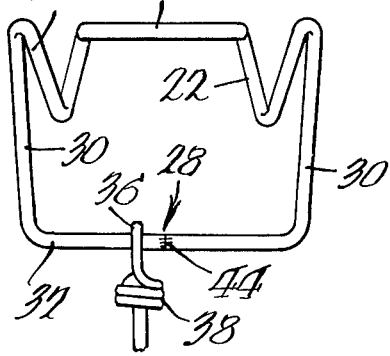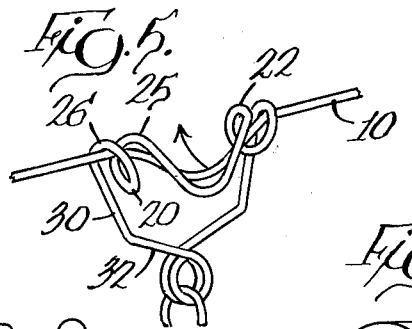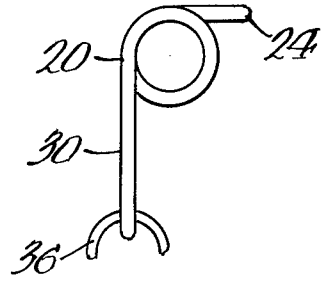

FISH STRINGER

BACKGROUND OF THE INVENTION

A very successful fish stringer widely present on the market consists of a length of chain with a plurality of safety-pin-like fish clips secured to the chain at spaced intervals. The sharp end of the clip wire is normally lodged in a shielded pocket. To string a fish, the end is sprung out of the socket and threaded through the lower and upper lips of the fish and closed again. The bight of the clip permits enough jaw movement of the fish so that it can breathe freely while it is on the stringer. This type of stringer does a notably good job of keeping the fish alive until the day's fishing is done. The spaced intervals of the clips prevent crowding of the fish on the stringer and eventual jaw destruction and suffocation.

In pier and bridge fishing common in Florida and elsewhere, the fishing platform may be 12' to 20' or more above the water. Carrying such a length of line or chain with clips attached would present difficulties in tangling. Also, tailoring the length of the line to a variety of fishing locations presents obvious difficulties.

The lip hooking of the fish also raises problems in regard to a conventional stringer. The lips, while fairly strong and tough, can tear through. Such tearing is a likely eventuality when the fishing is good and the stringer must frequently be raised 12' in the air, for instance, to add another fish to it, the fish already on the stringer jerking and flopping. Even if the already caught fish should not shake themselves free, damage to the jaws and breathing mechanism is likely such that the fish may die prematurely.

SUMMARY OF THE INVENTION

This invention is directed to a fish stringer and to the link forming a part thereof which avoids the above difficulties. The link itself consists of a closed loop of stiff wire to which a fish clip is secured, the link being adapted for a secure, sliding attachment to a line, cable or chain intermediate its length such that the fish holders can be carried separately from the line and the length of the line be determined according to the particular requirements of the fishing location. The separate and detached transport of the line and the holders greatly reduces tangling. The closed-loop nature of the link minimizes tangling as among the holders themselves. The length of the links on the line is substantial so as to afford good spacing for the fish on the stringer.

The ready attachability of the holders to the line between its ends permits the attachment of each fish individually to the line at the fishing platform and permitting the fish and holder to drop down into the water without the necessity of hauling up the stringer with the fish already caught on it and without the necessity of untying the line from its anchoring point on the bridge or pier.

Attention is directed to the following patents, the first two particularly.

| Patent No. | To | Issued |
|---|---|---|
| 2,125,770 | S. Dabroski | Aug. 2, 1938 |
| 3,055,332 | V. J. Linsdeau | Sept. 25, 1962 |
| 2,111,958 | D. M. Bardon | Mar. 22, 1938 |
| 2,217,972 | W. E. Smith | Oct. 15, 1940 |
| 3,120,715 | A. E. Long | Feb. 11, 1964 |

BRIEF DESCRIPTION OF THE DRAWINGS

FIG. 1 is a perspective of a portion of a stringer line with a pair of the fish holders mounted thereto;

FIG. 2 is a front elevation of the fish holder of FIG. 1;

FIG. 3 is an end elevation of the link of FIG. 2;

FIG. 4 is a perspective view of a link of the invention and a section of stringer cord illustrating the beginning of the attachment of the link to the cord;

FIG. 5 is a view similar to FIG. 4 illustrating a final step in the attachment of the link to the cord;

FIG. 6 is a fragmentary front elevation similar to FIG. 2 illustrating a modified form of the link; and FIG. 7 is an end elevation of the link of FIG. 6.

DESCRIPTION OF THE PREFERRED EMBODIMENT

In FIG. 1 is shown a length of fish stringer line or cord 10 with two fish holders 12 mounted thereto. The fish holders consist of a clip 14 and a link 16. The cord 10 may be rope, chain, or cable, but it must be flexible. The cord should have a stop on one end thereof, here shown to be a relatively large washer 18 to which the cord is knotted.

The link consists of a length of stiff wire, for instance 14 gauge iron wire, which may be plated for corrosion resistance. The wire is formed to have a pair of oppositely wound coils 20 and 22 formed therefrom having a common center line or axis. A bridging portion or tongue 24 which may be pointed, round or straight (FIG. 6) bridges the adjacent ends of the coils and extends beyond the periphery of the coils. In the drawings, the left hand coil 20 has a right hand twist to it and the right hand coil 22 has a left hand twist to it. As illustrated in FIGS. 1-5, the coils are wound through about 540° and the turns 25, 26 of each coil are imperatively spaced apart by at least the diameter of the cord, chain or cable which is to constitute the string for the stringer. The wire at the remote ends of the coils 20, 22 occupy a common plane tangent to the two coils 20, 22 and extend away from the coils convergently toward each other to a point of meeting 28 well spaced from the common axis of the two coils 20 and 22. The tongue extends from the coils a short distance parallel to the plane of the wires and tangent to the other side of the coils.

The link may perhaps be visualized better from one method of fabrication. If the wire were to be bent into a V shape (FIGS. 1-5) or with a U shape with divergent legs (FIG. 6) the apex at the center of the wire, the two arms of the wire laid against the same side of a cylindrical mandrel a short distance away from the apex, the apex positionally anchored to the mandrel, and the arms bent around the mandrel an equal number of turns in an outwardly spiraling fashion, the twin coil structure will be achieved. Thereafter, the unspiralled arm ends will be bent toward each other, first a slightly convergent angle to define legs 30 and then a sharply convergent angle to meet and define a crossbar 32 generally parallel to and well spaced from the axis of the coils.

The juncture of the legs at the point of meeting may be effected in various ways. In the embodiment illustrated in FIGS. 1 through 5, the two ends of the wire are formed into overlapping eyes 34, and one loop 36 of a swivel 38 passes through both eyes to hold them together. The other end 40 of the swivel mounts the fish clip 42. In the modification shown in FIGS. 6 and 7, the two ends of the wire are welded together as at 44. Where welding is the means for connecting the two ends of the wire, the weld may be located at any point in the length of the wire, the center of the tongue 24 linking the two coils, for instance. Other means of connecting the ends of the wire might be twisting them together, enclosing them in the ends of a sleeve, etc.

In the modification shown in FIGS. 6 and 7, it will be noted that the swivel 38 is mounted directly on the closed loop of the link 16 and thus is not positionally fixed on the link as is the modification shown in FIGS. 1 through 5.

It is possible to mount the fish clip 42 directly to the link without the interposition of the swivel 38.

The method of attaching the link to the stringer cord is particularly illustrated in FIG. 4 and 5. The link is oriented with the legs to the back and the tongue to the front. The cord is laid against the front of the legs 30 and in contact with the underside of the coils 20 and 22. A shallow loop of the cord between the legs is drawn backward and upward to lodge the cord in the upper part of the outermost turn of the coils as shown in FIG. 4. The loop is then drawn forwardly and down over the end of the tongue 24 and released (FIG. 5). This lodges the cord in the innermost turn of the coils and the link is thereby entrained on the cord with the cord extending along the common axis of the two loops. The link, thus, is attached in an encircling, sliding relationship to the cord between its ends without the necessity of threading an end of the cord through the coils. Detachment is similarly easy.

The tongue extending well away from the periphery of the coils requires substantial slack in the cord for the cord's passage thereover, so contributing to the security of the attachment.

The angularity or rotation of the coils 20 and 22 is subject to some variation. Obviously, there is no point in carrying their rotation farther than is necessary to obtain a positive, loss-proof attachment to the cord. The illustrated 540° angularity of the coils of FIGS. 1 through 5 serves this purpose well. There is no point in carrying the rotation farther than this degree in that it consumes additional wire and requires somewhat more effort to attach the link to the cord. The modification illustrated in FIGS. 6 and 7 illustrates coils wound through 540°. The extension of the tongue in both instances contributes to the security.

The limiting case, of course, is a bend of greater than 180° such that the plane of the tongue and of the legs intersect. Thus, a coil of 270° would provide fair security for the attachment of the link to the cord if the tongue projected well through and beyond the plane established by the legs. Such a link, however, in addition to lacking the security of a greater angularity of bend, would have the disadvantage of a substantial projection in two planes at right angles to each other which would add to the space required in transporting a number of such links.

A characteristic length of the link would be about two inches between the outer ends of the coils. This provides adequate spacing of the fish on the stringer cord. The links, of course, will stack on the cord. The links may be longer if larger fish are anticipated.

The convergence of the legs 30 permits independent swiveling of the links with a minimum of interference.

I claim:

1. A fish stringer comprising a flexible line and a plurality of fish holders, each of said fish holders comprising a link adapted for sliding attachment to said line and a fish clip connected to said link, said link comprising a closed loop of relatively stiff wire conformed to provide at the ends of one side thereof a pair of oppositely wound coils extending through more than 360°, said coils having a common axis, an inside diameter greater than the diameter of said line and the turns of each coil spaced by a distance greater than the diameter of said line, the length of said side including said coils being the greatest dimension of said loop, said line extending centrally through both of said coils of each of said holders, said sides constituting spacers for the clips of adjacent holders.

2. The combination as set forth in claim 1 wherein the angularity of said coils is at least 450°.

3. The combination as set forth in claim 1 wherein said fish clip is secured to a point on said loop opposite said coils.

4. The combination as set forth in claim 1 wherein said coils are spaced, and the wire between said coils is conformed to provide a tongue tangent to said coils at its base and extending away from said coils.

* * * * *